(12) United States Patent
Kachi

(10) Patent No.: US 7,134,487 B2
(45) Date of Patent: Nov. 14, 2006

(54) VEHICLE AIR CONDITIONER

(75) Inventor: Michihiro Kachi, Kariya (JP)

(73) Assignee: Denso Corporation, Kariya (JP)

( * ) Notice: Subject to any disclaimer, the term of this patent is extended or adjusted under 35 U.S.C. 154(b) by 370 days.

(21) Appl. No.: 10/726,793

(22) Filed: Dec. 3, 2003

(65) Prior Publication Data

US 2004/0112075 A1   Jun. 17, 2004

(30) Foreign Application Priority Data

Dec. 13, 2002   (JP) .............................. 2002-362800

(51) Int. Cl.
  *B60H 1/00* (2006.01)
(52) U.S. Cl. ........................ 165/204; 165/203; 454/121
(58) Field of Classification Search .................. 165/42, 165/43, 202, 203, 204; 454/69, 121
See application file for complete search history.

(56) References Cited

U.S. PATENT DOCUMENTS 6,913,529 B1 * 7/2005 Seki ............................ 165/43

6,920,921 B1 * 7/2005 Nagata et al. ............... 165/202

FOREIGN PATENT DOCUMENTS

JP         5-58143      3/1993
JP         10-35251     2/1998

* cited by examiner

Primary Examiner—Ljiljana Ciric
(74) Attorney, Agent, or Firm—Harness, Dickey & Pierce, PLC

(57) ABSTRACT

In a vehicle air conditioner, a foot door is rotatably supported for opening and closing a foot opening and an air port communicating with defrost and face openings. The foot door has a guide plate. The guide plate functions as a heated air guide portion for directing heated air heated by a heating device to merge with cooled air that bypasses the heating device when the foot door is at a defrost/face mode position. The guide plate functions as a cooled air guide portion for directing the cooled air to merge with the heated air when the foot door is at a foot mode position. Accordingly, the heated air and the cooled air are sufficiently mixed with each other. Because the guide plate is moved for switching the defrost/face mode position and the foot mode position, the flow of air is not blocked by the guide plate.

9 Claims, 5 Drawing Sheets

VEHICLE AIR CONDITIONER

CROSS REFERENCE TO RELATED APPLICATION

This application is based on Japanese Patent Application No. 2002-362800 filed on Dec. 13, 2002, the disclosure of which is incorporated herein by reference.

FIELD OF THE INVENTION

The present invention relates to a vehicle air conditioner that controls the temperature of air, which is to be supplied into a passenger compartment of a vehicle, by adjusting an opening rate of an air mix door.

BACKGROUND OF THE INVENTION

With regard to a vehicle air conditioner unit disclosed in JP-A-10-35251, as shown in FIG. 6, an air conditioner unit case defines a heated air passage through which air heated by a heating device 110 flows and a cooled air passage through which air cooled by the cooling device 100 flows while bypassing the heating device 110. An air mix door 120 is provided upstream of the heating device 110 with respect to an air flow direction. The air mix door 120 adjusts a ratio of a volume of air to be heated by the heating device 110 to a volume of cooled air flowing in the cooled air passage, thereby controlling the temperature of air to be blown into a passenger compartment.

Further, to improve mixing of the cooled air and the heated air, a guide wall 130 is provided at a position downstream of the heating device 110. The guide wall 130 directs the flow of the heated air toward the cooled air passage so that the heated air merges with the cooled air of the cooled air passage at a substantially right angle.

However, the guide wall 130 is arranged to extend between the heated air passage and a foot opening 140. In a foot mode shown in FIG. 6, the heated air flows toward the cooled air passage along the guide wall 130 and then turns at the end of the guide wall 130 toward the foot opening 140 as denoted by an arrow A. As a result, resistance of the air flow is likely to be increased, and therefore the volume of air to be blown into the passenger compartment is reduced. Furthermore, this may result in an increase in noise.

SUMMARY OF THE INVENTION

The present invention is made in view of the foregoing matter and it is an object of the present invention to provide a vehicle air conditioner capable of reducing resistance of an air flow and noise and improving an air mixing performance.

According to a first aspect of the present invention, an air conditioner for a vehicle includes a unit case, a cooling device for cooling air, a heating device for heating air, an air mix door, and a switching door. The cooling device and the heating device are housed in the unit case. The heating device is located downstream of the cooling device. The air mix door moves to adjust a ratio of a volume of air to be heated by the heating device to a volume of cooled air, which is cooled by the cooling device and bypasses the heating device, to thereby control temperature of air to be blown into a passenger compartment of the vehicle. The unit case defines a first opening such as a face opening and a defrost opening through which air to be blown to an upper region of the passenger compartment flows and a second opening such as a foot opening through which air to be blown to a lower region of the passenger compartment flows. The switching door is rotatably supported in the unit case for opening and closing a first passage communicating with the first opening and a second passage communicating with the second opening. The switching door includes a guide plate that is rotatable with the switching door about a rotation axis. The guide plate is disposed to direct the heated air, which is heated by the heating device such that the heated air merges with the cooled air flowing in the first passage when the switching door opens the first passage and closes the second passage and to direct the cooled air such that the cooled air merges with the heated air flowing in the second passage when the switching door closes the first passage and opens the second passage.

Accordingly, when the switching door opens the first passage and closes the second passage, the guide plate functions as a heated air guide portion for directing the heated air to merge with the cooled air. When the switching door closes the first passage and opens the second passage, the guide plate functions as a cooled air guide portion for directing the cooled air to merge with the heated air. Therefore, the heated air and the cooled air are sufficiently mixed with each other by the function of the guide plate. In addition, since the guide plate moves to switch the first passage and the second passage, when the first passage is opened, the flow of the cooled air toward the first opening is not blocked by the guide plate. Also, when the second passage is opened, the flow of the heated air toward the second opening is not blocked by the guide plate.

According to a second aspect of the present invention, the guide plate of the switching door is disposed to direct the cooled air such that the cooled air merges with the heated air flowing in the first passage when the switching door opens the first passage and closes the second passage and to direct the heated air such that the heated air merges with the cooled air flowing in the second passage when the switching door closes the first passage and opens the second passage.

Accordingly, when the switching door opens the first passage and closes the second passage, the guide plate functions as the cooled air guide portion. When the switching door opens the second passage and closes the first passage, the guide plate functions as the heated air guide portion. Therefore, the heated air and the cooled air are sufficiently mixed with each other by the function of the guide plate. In addition, since the guide plate moves to switch the first passage and the second passage, when the first passage is opened, the flow of the heated air toward the first opening is not blocked by the guide plate. Also, when the second passage is opened, the flow of the cooled air toward the second opening is not blocked by the guide plate.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Embodiments of the present invention will be described hereinafter with reference to the drawings.

[First Embodiment]

Figure 1:
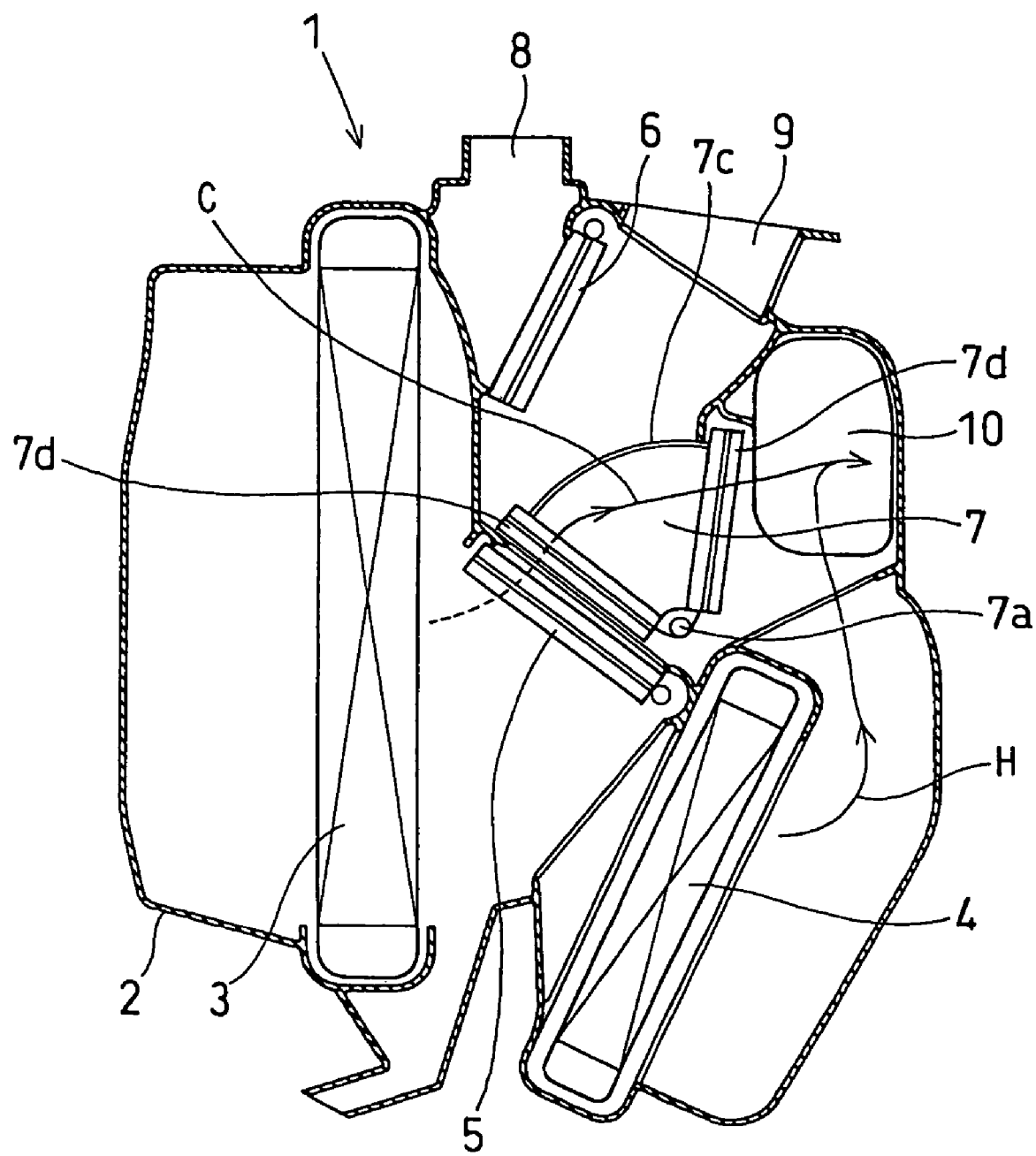
FIG. 1 is a schematic cross-sectional view of an air conditioner unit for explaining its internal structure in a foot mode according to the first embodiment of the present invention.

A vehicle air conditioner of the present invention includes an air conditioner unit 1 shown in FIG. 1. The air conditioner unit 1 controls the temperature of air, which is supplied from a blower unit (not shown), and supplies the air into a passenger compartment.

The air conditioner unit 1 includes a unit case 2, a cooling device 3, a heating device 4, an air mix door 5, opening switching doors 6, 7, and the like. The devices 3, 4 and the doors 5 to 7 are accommodated in the unit case 2.

The unit case 2 is formed with openings 8 to 10 through which the air is introduced to air outlets (not shown) of the passenger compartment according to opening modes (described later) and then blown into the passenger compartment from the respective outlets. Specifically, the air having passed through the defrost opening 8 is blown toward a windshield of a vehicle. The air having passed through the face opening 9 is blown toward an upper body of a passenger, that is, an upper half region of the compartment. Also, the air having passed through the foot opening 10 is blown toward foot area of the passenger, that is, a lower half region of the compartment.

The cooling device 3 is for example a refrigerant evaporator included in a refrigerant cycle. A refrigerant, which has a low temperature, circulates in the inside of the cooling device 3. The refrigerant evaporates by absorbing heat from air passing outside of the cooling device 3, and therefore the air is cooled.

Figure 3:
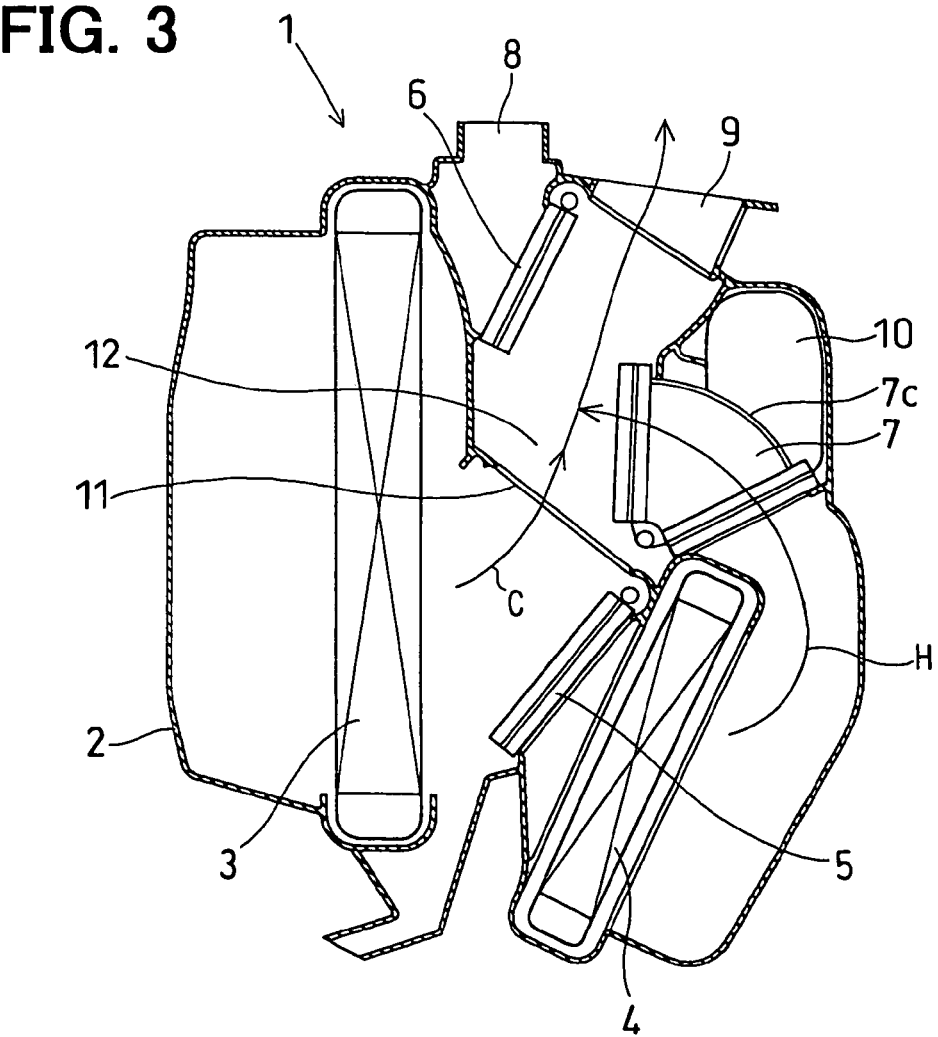
FIG. 3 is a schematic cross-sectional view of the air conditioner unit in a face mode according to the first embodiment of the present invention.

The heating device 4 is arranged downstream of the cooling device so that the cooled air, which has been passed through the cooling device 3, passes through the heating device 4. A warm water such as an engine cooling water flows in the inside of the heating device 4. The air is heated by the warm water while passing through the heating device 4. Also, a bypass port 11 is formed at a position upstream of the heating device 4 in the unit case 2, as shown in FIG. 3. The by passport 11 allows the cooled air to bypass the heating device 4.

The air mix door 5 is rotatably supported between the cooling device 3 and the heating device 4. The air mix door 5 is rotatable between a maximum cooling position shown in FIG. 3 and a maximum heating position shown in FIG. 1. When the air mix door 5 is at the maximum cooling position, an air inlet for the heating device 4, through which air to be heated flows is fully closed by the air mix door 5, so the cooled air flows in the bypass port 11. When the air mix door 5 is at the maximum heating position, the bypass port 11 is fully closed by the air mix door 5, so the air fully passes through the heating device 4. The ratio of a volume of the air (heated air) passing through the heating device 4 to a volume of the air (cooled air) bypassing the heating device 4 is controlled according to the opening position of the air mix door 5.

The defrost/face switching door 6 is provided to selectively open and close the defrost opening 8 and the face opening 9. The foot door (switching door) 7 is disposed to selectively open and close the foot opening 10 and an airport 12 (FIG. 3) that communicates with the defrost opening 8 and the face opening 9.

Figure 4:
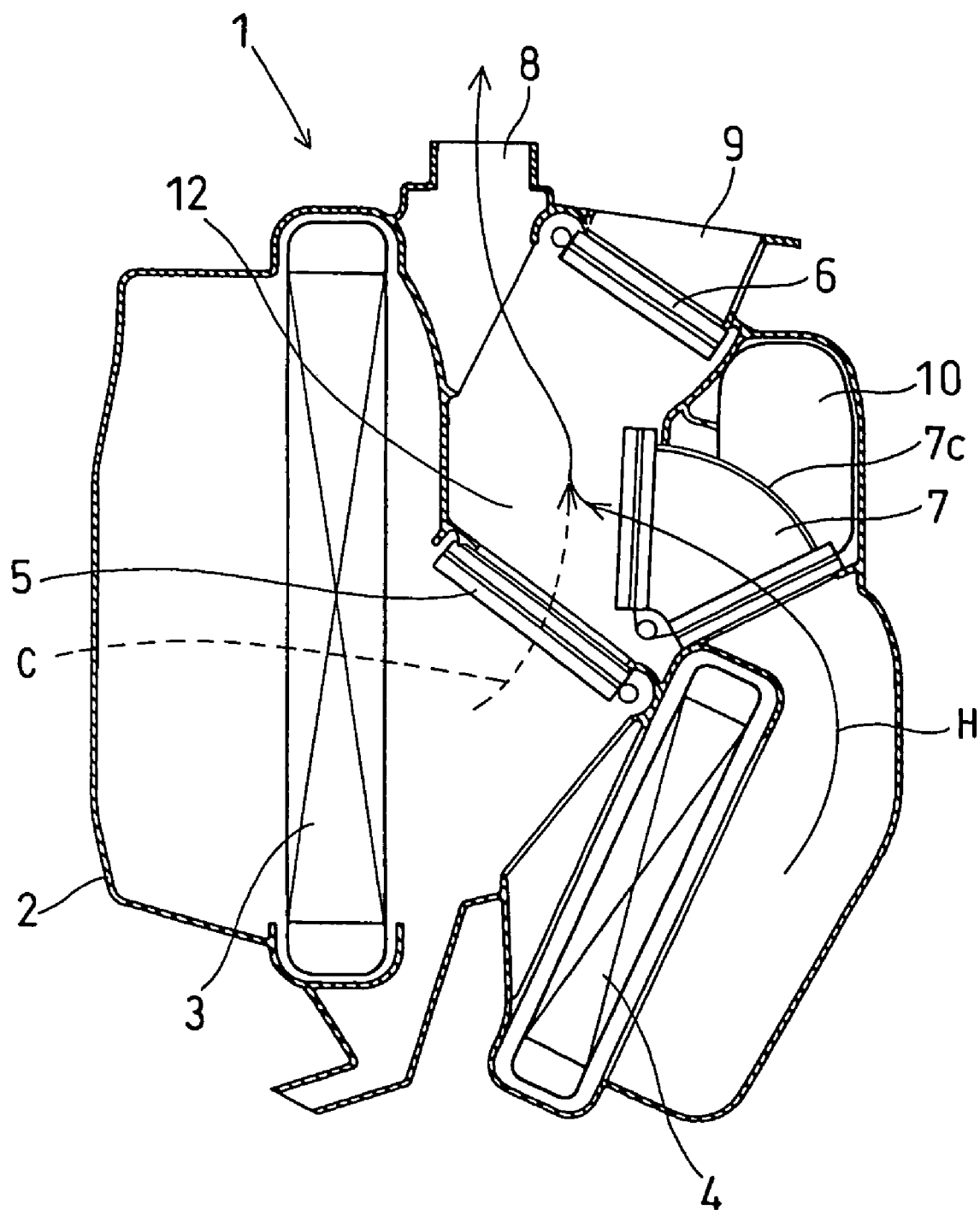
FIG. 4 is a schematic cross-sectional view of the air conditioner unit in a defrost mode according to the first embodiment of the present invention.

Specifically, the foot door 7 is supported such that it is rotatable between a foot mode position shown in FIG. 1 and a defrost/face mode position shown in FIGS. 3 and 4. When the foot door 7 is at the foot mode position, the air port 12 is closed and the foot opening 10 is open. When the foot door 7 is at the defrost/face mode position, the foot opening 10 is closed and the air port 12 is open.

Figure 2:
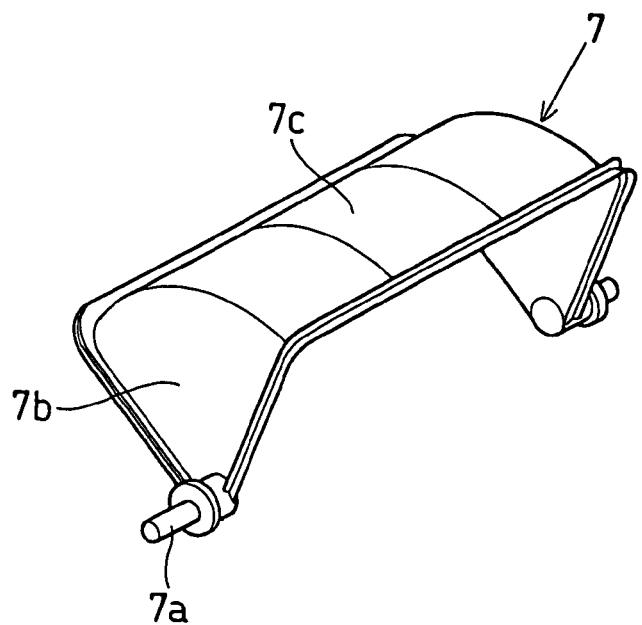
FIG. 2 is a perspective view of a foot door according to the first embodiment of the present invention.

As shown in FIG. 2, the foot door 7 has side plates 7b rotatably supported by shaft portions 7a, a guide plate 7c connecting the side plates 7b. The foot door 7 is rotatable about the shaft portions 7a. The guide plate 7c is curved in an arc shape a long a circumference of the rotation. The guide plate 7c and the side plates 7b defines a substantially U-shaped opening.

Further, as shown in FIG. 1, sealing members 7d are provided along the peripheries of the U-shaped opening of the foot door 7, that is, along the edges of the guide plate 7c and the side plates 7b. When the foot door 7 is at the foot mode position and the defrost/face mode position, the sealing members 7d make contact with sealing surfaces of the unit case 2, thereby air-tightly sealing the foot opening 10 and the air port 12, respectively.

When the foot door 7 is at the defrost/face mode position as shown in FIGS. 3 and 4, the guide plate 7c functions as a heated air guide portion for directing the heated air toward a cooled air passage (arrow C) through which the cooled air bypassing the heating device 4 flows toward the defrost opening 8 and the face opening 9. Further, when the foot door 7 is at the foot mode position, as shown in FIG. 1, the guide plate 7c functions as a cooled air guide portion for directing the cooled air toward a heated air passage (arrow H) through which the heated air flows toward the foot opening 10. In the drawings, the arrow C denotes the passage of the cooled air, and the arrow H denotes the passage of the heated air.

Next, operation of the embodiment will be described.

Air blown from the blower unit is cooled while passing through the cooling device 3. A temperature of air to be supplied into the passenger compartment is controlled in accordance with an opening rate of the air mix door 5. During a maximum cooling operation, the air mix door 5 is moved to the maximum cooling position at which the air inlet portion of the heating device 4 is fully closed. Thus, the cooled air fully flows in the bypass port 11 while bypassing the heating device 4. That is, the cooled air is not heated by the heating device 4. On the other hand, during a maximum heating operation, the air mix door 5 is moved to the maximum heating position where the bypass port 11 is fully closed (FIG. 1). Thus, the cooled air is fully supplied toward the heating device 4 and heated by the heating device 4.

The conditioned air, the temperature of which is controlled, is introduced to the selected openings that are selected according to the following opening modes and blown into the passenger compartment from the respective outlets.

(1) Defrost Mode

As shown in FIG. 4, the foot door 7 is moved to the defrost/face mode position so that the foot opening 10 is closed. Also, the defrost/face switching door 6 closes the face opening 9 and opens the defrost opening 8. Thus, the conditioned air passes through the defrost opening 8 and is then blown toward the windshield of the vehicle.

(2) Face Mode

As shown in FIG. 3, the foot door 7 is moved to the defrost/face mode position so that the foot opening 10 is closed. Also, the defrost/face switching door 6 closes the defrost opening 8 and opens the face opening 9. Thus, the conditioned air passes through the face opening 9 and is then blown toward the upper region of the passenger compartment.

(3) Foot Mode

As shown in FIG. 1, the foot door 7 is moved to the foot mode position, thereby fully closing the air port 12 and opening the foot opening 10. Thus, the air passes through the foot opening 10 and is then blown toward the lower region of the passenger compartment.

(4) Bi-Level Mode

The foot door 7 is moved to a middle position between the defrost/face mode position and the foot mode position, thereby opening a half of the foot opening 10 and a half of the air port 12. Also, the defrost/face switching door 6 closes the defrost opening 8 and opens the face opening 9. Thus, the conditioner air passes through the face opening 9 and the foot opening 10 and is then blown toward the upper region and the lower region of the passenger compartment.

In the case that the air mix door 5 is between the maximum cooling position and the maximum heating position for mixing the cooled air and the heated air, during the defrost mode and the face mode, the heated air is directed toward the cooled air passage C by the guide plate 7c and mixed with the cooled air of the cooled air passage C. Thereafter, the mixed air is introduced to the defrost opening 8 and the face opening 9. Further, in the foot mode where the foot door 7 fully closes the air port 12, the cooled air is directed toward the heated air passage H by the guide plate 7c and mixed with the heated air of the heated air passage H. Thereafter, the mixed air is introduced to the foot opening 10.

Accordingly, in the case of supplying the mixed air to the passenger compartment, the guide plate 7c functions as the heated air guide portion in the defrost and face modes and as the cooled air guide portion in the foot mode. Therefore, the cooled air and the heated air are sufficiently mixed with each other by the functions of the guide plate 7c. In this way, the air mixing performance improves.

Also, the guide plate 7c is moved for switching the defrost/face mode and the foot mode. Therefore, during the face mode and the defrost mode, the guide plate 7c does not block the cooled air passage C. Accordingly, the cooled air smoothly flows toward the defrost opening 8 and the face opening 9. Similarly, in the foot mode, the guide plate 7c does not block the heated air passage H. Accordingly, the heated air smoothly flows toward the foot opening 10. In this way, the guide plate 7c facilitates the flow of the air. Since an increase in the air flow resistance is suppressed, it is less likely that the air blow volume will be reduced. Further, it suppresses an increase in the noise.

The foot door 7 can be disposed such that at least a part of foot opening 10 is opened and closed by the guide plate 7c. In addition to the function as the heated air guide portion and the cooled air guide portion, the door 7 has a function of opening and closing the air port 12 and the foot opening 10. Thus, the air guiding function and the opening/closing function are provided by a single, compact door 7. Furthermore, since the guide plate 7c has the arc shape, the flow of the air is smoothly directed.

[Second Embodiment]

Figure 5:
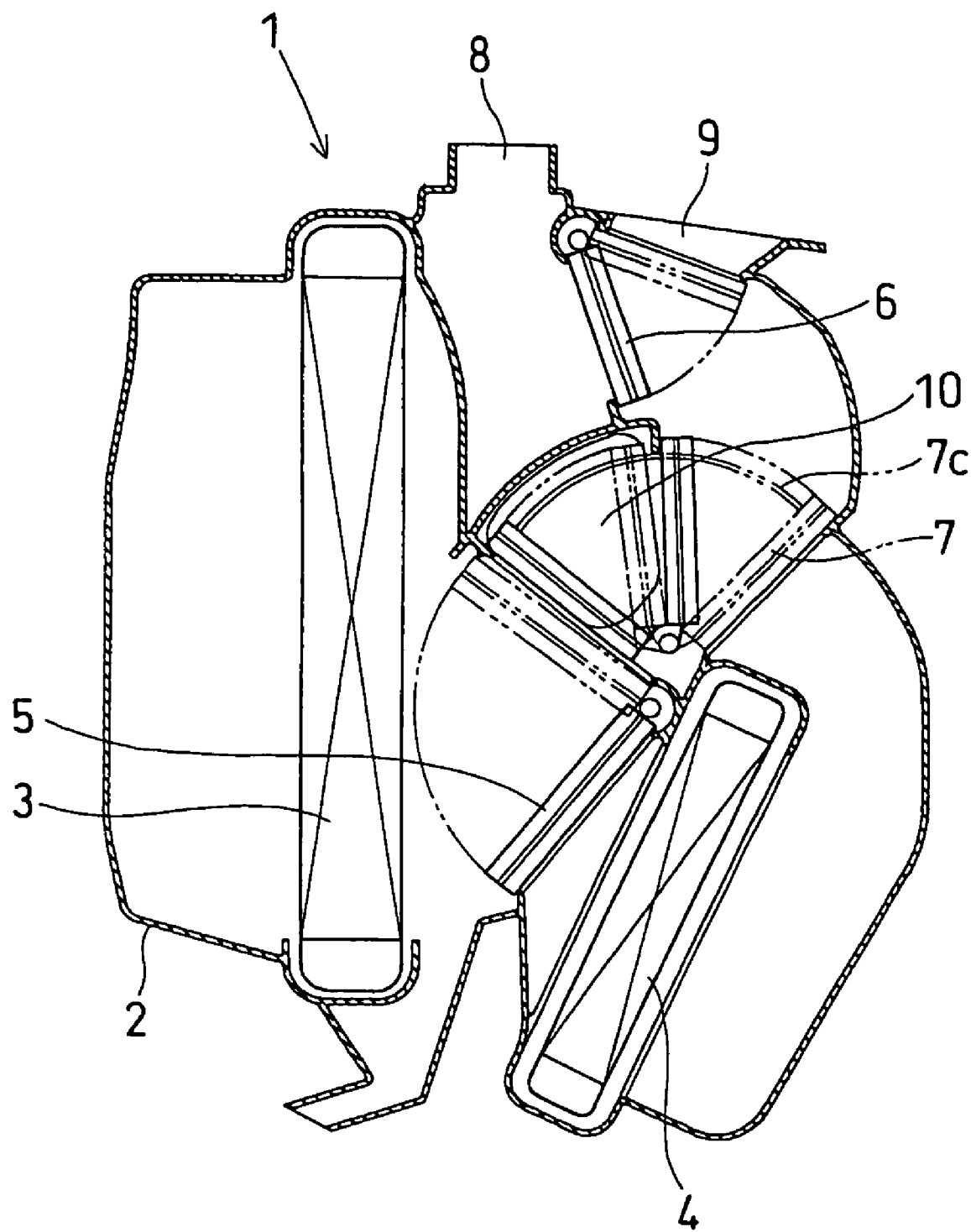
FIG. 5 is a schematic cross-sectional view of an air conditioner unit according to the second embodiment of the present invention.
Figure 6:
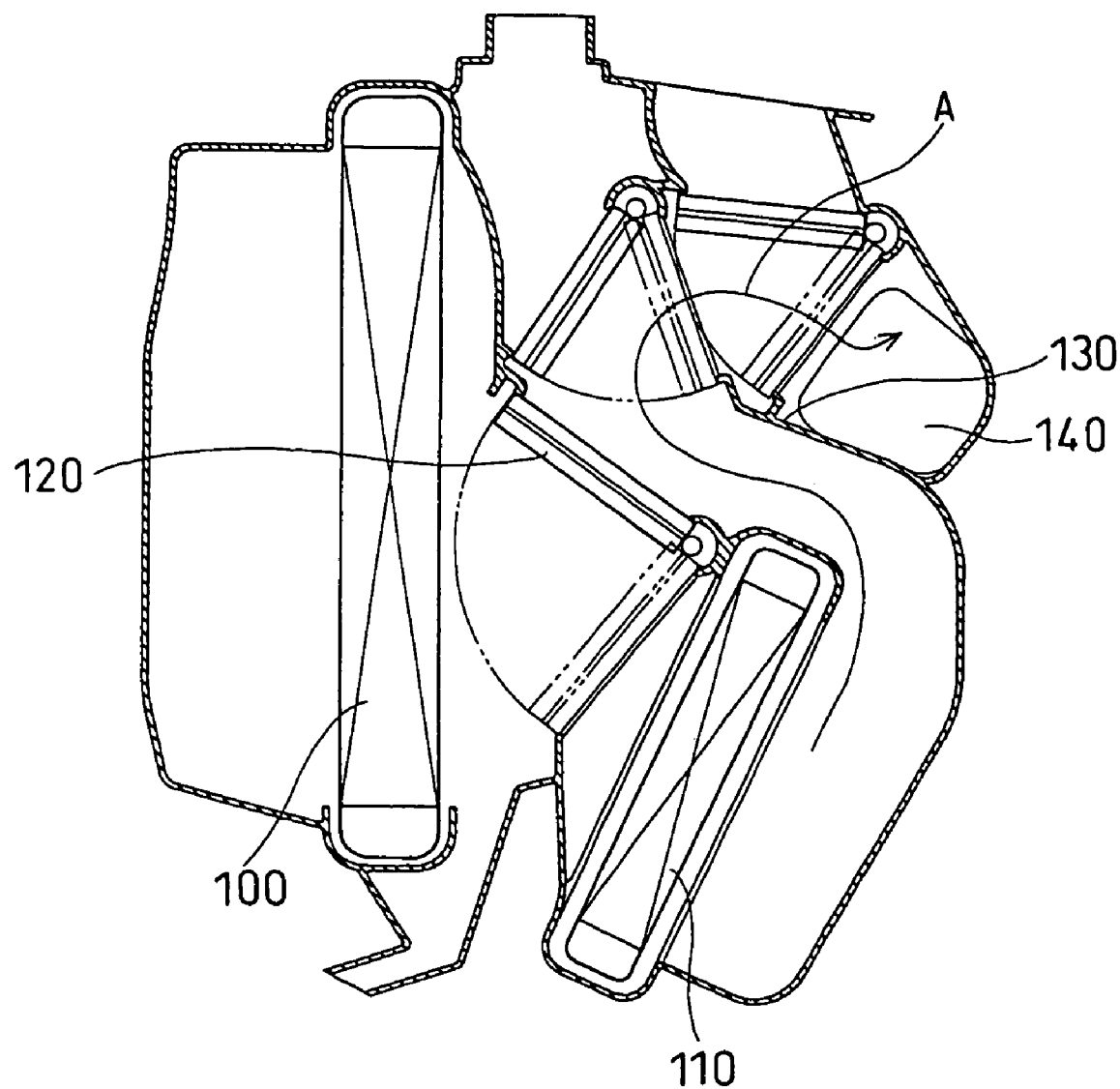
FIG. 6 is a schematic cross-sectional view of an air conditioner unit according to a prior art.

In the second embodiment, the foot opening 10 is arranged at a position different from that of the first embodiment. As shown in FIG. 5, the foot opening 10 is located at a position midstream of the cooled air passage through which the cooled air bypasses the heating device 4 and flows toward the defrost opening 8 and the face opening 9.

When the foot door 7 is at the defrost/face mode position, as denoted by a solid line in FIG. 5, the guide plate 7c functions as a cooled air guide portion for directing the cooled air toward the heated air passage through which the heated air flows toward the defrost opening 8 and face opening 9. On the other hand, when the foot door 7 is at the foot mode position, as denoted by a chain double-dashed line in FIG. 5, the guide plate 7c functions as a heated air guide portion for directing the heated air toward the cooled air passage through which the cooled air flows toward the foot opening 10.

When the air mix door 5 is moved to the middle position between the maximum cooling position and the maximum heating position to mix the heated air and the cooled air, in the defrost mode and in the face mode, the cooled air is guided toward the heated air passage by the guide plate 7c and mixed with the heated air of the heated air passage. Thereafter, the mixed air is introduced to the defroster opening 8 and the face opening 9. On the other hand, in the foot mode, the heated air is guided toward the cooled air passage by the guide plate 7c and mixed with the cooled air of the cooled air passage. Thereafter, the mixed air is introduced to the foot opening 10. Accordingly, the heated air and the cooled air are sufficiently mixed with each other.

Similar to the first embodiment, the defrost/face mode and the foot mode are switched by moving the guide plate 7c. Therefore, in the face mode and the defrost mode, the guide plate 7c does not block the heated air passage. Accordingly, the heated air smoothly flows toward the defrost opening 8 or the face opening 9. Similarly, in the foot mode, the guide plate 7c does not block the cooled air passage. Accordingly, the cooled air smoothly flows toward the foot opening 10. In this way, the guide plate 7c directs the air without increasing in the air flow resistance. Therefore, it is less likely that the necessary air blow volume is reduced. Further, it suppresses an increase in noise.

[Other Embodiments]

The shape of the guide plate 7c is not limited to the arc shape. It can have another shape such as a form of plate as long as improving performance of mixing the heated air and the cooled air.

In above embodiments, the sealing structure for air-tightly closing the foot opening 10 and the air port 12 are provided by the sealing members 7d. In place of the sealing members 7d, the air port 12 and the foot opening 10 are opened and air-tightly closed by the guide plate 7c.

The present invention should not be limited to the disclosed embodiment, but may be implemented in other ways without departing from the spirit of the invention.

What is claimed is:

1. An air conditioner for a vehicle comprising:
   a cooling device for cooling air;
   a heating device provided downstream of the cooling device for heating air;
   an air mix door for adjusting a ratio of a volume of air that bypasses the heating device and which flows through a first passage communicating with a first opening to a volume of air that flows through the heating device and through a second passage communicating with a second opening, thereby controlling a temperature of air to be blown into a passenger compartment of the vehicle;

a unit case housing the cooling device, the heating device and the air mix door, wherein the unit case defines the first opening through which air to be blown toward an upper region of the passenger compartment flows and the second opening through which air to be blown toward a lower region of the passenger compartment flows; and a switching door rotatably supported in the unit case, the switching door movable between a first position where the first passage is open and the second passage is closed and a second position where the first passage is closed and the second passage is open; wherein the switching door includes a guide plate that is rotatable with the switching door, and the guide plate is disposed to direct heated air, which is heated by the heating device, such that the heated air merges with the cooled air flowing in the first passage when the switching door is in the first position and to direct the cooled air such that the cooled air merges with the heated air flowing in the second passage when the switching door is in the second position.

2. The air conditioner according to claim 1, wherein the switching door is disposed such that the guide plate opens and closes at least a part of the second opening.

3. The air conditioner according to claim 1, wherein the guide plate has an arc shape.

4. The air conditioner according to claim 1, wherein
the switching door has side walls extending from ends of the guide plate to a rotation axis of the switching door so that the switching door forms a substantially U-shaped structure, when the switching door closes the second passages the heated air flows through the U-shaped structure, and when the switching door closes the first passage, the cooled air flows through the U-shaped structure.

5. The air conditioner according to claim 1, further comprising:

a defrost/face door supported in the unit case, wherein the first opening includes a face opening through which air to be blown toward an upper half body of a passenger flows and a defrost opening through which air to be blown toward a windshield of the vehicle flows, and the defrost/face door opens and closes both the defrost opening and the face opening.

6. An air conditioner for a vehicle comprising:

a cooling device for cooling air;

a heating device provided downstream of the cooling device for heating air;

an air mix door for adjusting a ratio of a volume of air to be heated by the heating device to a volume of cooled air that is cooled by the cooling device and bypasses the heating device, thereby controlling a temperature of air to be blown into a passenger compartment of the vehicle;

a unit case housing the cooling device, the heating device and the air mix door, wherein the unit case defines a first opening through which air to be blown toward an upper region of the passenger compartment flows and a second opening through which air to be blown toward a lower region of the passenger compartment flows; and a switching door rotatably supported in the unit case for opening and closing a first passage communicating with the first opening and a second passage communicating with the second opening, wherein the switching door includes a guide plate that is rotatable with the switching door;

the guide plate is disposed to direct heated air, which is heated by the heating device, such that the heated air merges with the cooled air flowing in the first passage when the switching door opens the first passage and closes the second passage and to direct the cooled air such that the cooled air merges with the heated air flowing in the second passage when the switching door closes the first passage and opens the second passage;

the switching door has side walls extending from ends of the guide plate to a rotation axis of the switching door so that the switching door forms a substantially U-shaped structure; and when the switching door closes the second passage, the heated air flows through the U-shaped structure, and when the switching door closes the first passage, the cooled air flows through the U-shaped structure.

7. The air conditioner according to claim 6, wherein the switching door is disposed such that the guide plate opens and closes at least a part of the second opening.

8. The air conditioner according to claim 6, wherein the guide plate has an arc shape.

9. The air conditioner according to claim 6, further comprising:

a defrost/face door supported in the unit case, wherein the first opening includes a face opening through which air to be blown toward an upper half body of a passenger flows and a defrost opening through which air to be blown toward a windshield of the vehicle flows, and the defrost/face door opens and closes both the defrost opening and the face opening.

* * * * *